(12) United States Patent
Paterson et al.

(10) Patent No.: US 7,722,694 B2
(45) Date of Patent: May 25, 2010

(54) FILTER SYSTEM FOR AN AIR CLEANER

(75) Inventors: Christopher M. Paterson, Biloxi, MS (US); Jadon Gutierrez, Gulfport, MS (US); Paul A. Moshenrose, Ocean Springs, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 461 days.

(21) Appl. No.: 11/434,003

(22) Filed: May 15, 2006

(65) Prior Publication Data

US 2007/0261375 A1    Nov. 15, 2007

(51) Int. Cl.
  *B01D 59/50*    (2006.01)
(52) U.S. Cl. ............... 55/482; 55/343; 55/350.1; 55/419; 55/471; 55/483; 55/492; 55/495; 55/511; 55/DIG. 31
(58) Field of Classification Search ............ 55/471, 55/343, 350.1, 492, 495, 419, 482, 511, 483, 55/DIG. 31
See application file for complete search history.

(56) References Cited

U.S. PATENT DOCUMENTS

| 1,741,367 | A | * | 12/1929 | Irvin ..................... 261/80 |
| 4,701,196 | A | * | 10/1987 | Delany ................... 55/481 |
| 4,749,390 | A | * | 6/1988 | Burnett et al. ............. 96/57 |
| 5,817,975 | A |   | 10/1998 | Heilmann |
| 6,126,708 | A | * | 10/2000 | Mack et al. .............. 55/502 |
| 6,149,717 | A |   | 11/2000 | Satyapal et al. |
| 6,274,039 | B1 | * | 8/2001 | Brandhofer et al. ......... 210/232 |
| 6,451,079 | B1 | * | 9/2002 | Lange et al. .............. 55/379 |
| 6,464,760 | B1 | * | 10/2002 | Sham et al. .............. 96/117.5 |
| 6,494,940 | B1 |   | 12/2002 | Hak |
| 6,506,238 | B1 |   | 1/2003 | Endo |
| 6,616,736 | B2 |   | 9/2003 | Massey et al. |
| 6,679,940 | B1 |   | 1/2004 | Oda |
| 6,797,042 | B2 |   | 9/2004 | LaFerriere et al. |
| 6,923,911 | B1 | * | 8/2005 | Beier et al. .............. 210/273 |
| 7,135,051 | B2 | * | 11/2006 | Baldinger et al. ............ 55/337 |
| 2001/0029728 | A1 |   | 10/2001 | Massey et al. |
| 2004/0020363 | A1 |   | 2/2004 | LaFerriere et al. |
| 2008/0019861 | A1 | * | 1/2008 | Silderhuis .................. 422/3 |
| 2008/0184685 | A1 | * | 8/2008 | Kempf et al. .............. 55/497 |
| 2009/0078121 | A1 | * | 3/2009 | Hepburn .................. 96/222 |
| 2009/0188218 | A1 | * | 7/2009 | Pippel et al. .............. 55/383 |

OTHER PUBLICATIONS http://www.merriam-webster.com/dictionary/louver, Dec. 30, 2008.

* cited by examiner

*Primary Examiner*—Jason M Greene
*Assistant Examiner*—Anthony Shumate
(74) *Attorney, Agent, or Firm*—Winston & Strawn LLP

(57) ABSTRACT

A filter system for an air cleaner is provided according to an embodiment of the invention. The filter system includes a filter frame adapted to fit within the air cleaner and a filter assembly configured to fit to the frame. The filter assembly includes a top aperture and one or more filter panels. A filter panel of the one or more filter panels includes one or more panel edges and one or more interlocking tabs formed on the one or more panel edges.

33 Claims, 19 Drawing Sheets

FILTER SYSTEM FOR AN AIR CLEANER

TECHNICAL FIELD

The present invention relates to an air cleaner, and more particularly, to a filter system for an air cleaner.

BACKGROUND OF THE INVENTION

Air cleaners and purifiers are widely used for removing foreign substances from the air. The foreign substances can include pollen, dander, smoke, pollutants, dust, etc. In addition, an air cleaner can be used to circulate room air. An air cleaner can be used in many settings, including at home, in offices, workrooms, etc.

In a prior art air cleaner, a filter is typically inserted directly into some manner of filter slot or filter receptacle in the air cleaner. However, this prior art approach has drawbacks. The stand-alone prior art filter may not be sufficiently rigid, and can flex and buckle under conditions of a strong airflow. In the prior art air cleaner, the filter generally fits somewhat loosely into a slide-in holder, grooves, etc., and therefore air can leak around the edges of the filter. The prior art air cleaner generally does not clamp or securely hold the filter. The prior art air cleaner cannot clamp or securely hold one or more filters. The prior art comprises a flat filter panel, with a limited surface area for airflow to pass through. The limited surface area of the prior art impedes the airflow, increases the power required to generate the airflow, and is more susceptible to clogging.

SUMMARY OF THE INVENTION

A filter system for an air cleaner is provided according to an embodiment of the invention. The filter system comprises a filter frame adapted to fit within the air cleaner and a filter assembly configured to fit to the frame. The filter assembly comprises a top aperture and one or more filter panels. A filter panel of the one or more filter panels includes one or more panel edges and one or more interlocking tabs formed on the one or more panel edges.

A filter system for an air cleaner is provided according to an embodiment of the invention. The filter system comprises a filter frame adapted to fit within the air cleaner and a filter assembly configured to fit to the frame. The filter assembly comprises two or more filter panels oriented in two or more planes in a three-dimensional configuration. A filter panel of the one or more filter panels includes one or more panel edges and one or more interlocking tabs formed on the one or more panel edges.

An air cleaner is provided according to an embodiment of the invention. The air cleaner comprises an air duct located in the air cleaner and including an air inlet and an air outlet. The air cleaner further comprises an air moving device located in the air duct. The air moving device generates a duct airflow in the air duct from the air inlet to the air outlet. The air cleaner further comprises a filter system located in the air duct and comprising a filter frame and one or more filter panels positioned in a non-orthogonal orientation from the duct air flow. An incoming airflow passes through the one or more filter panels of the filter system before changing direction and transitioning into the duct airflow in the air duct.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-19 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
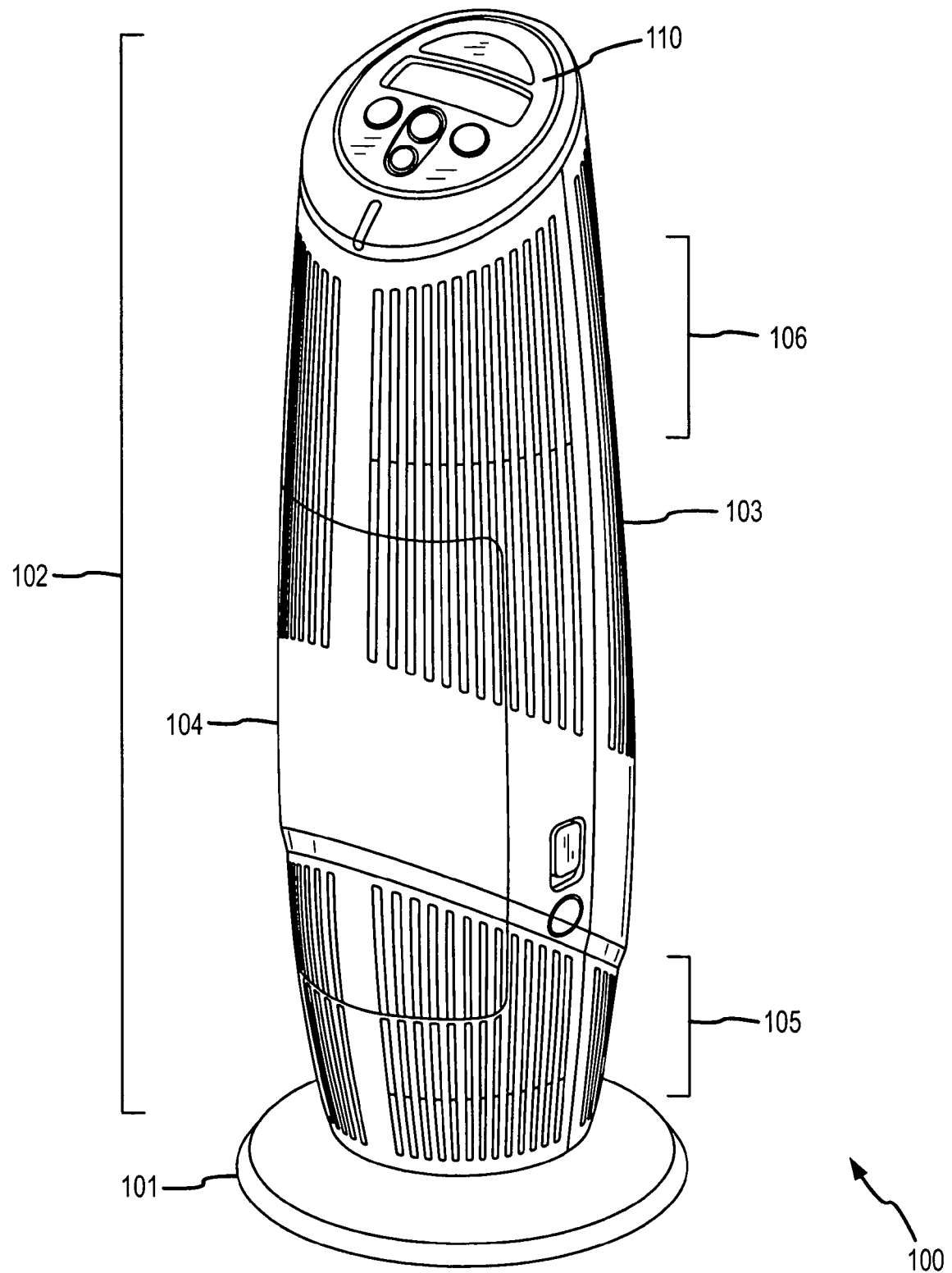
FIG. 1 shows a tower air cleaner according to an embodiment of the invention.

FIG. 1 shows a tower air cleaner 100 according to an embodiment of the invention. The air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106.

The air inlet 105 is shown as being at the lower end of the tower portion 102. However, it should be understood that alternatively the relative positions of the air inlet 105 and the air outlet 106 could be swapped.

It should be understood that a tower air cleaner is just one embodiment, and other configurations are contemplated and are within the scope of the description and claims. For example, the air cleaner 100 can comprise a tower air cleaner, a tabletop air cleaner, or a floor air cleaner, among others. The air cleaner 100 can comprise an elongate vertical or horizontal shape, a rectangular shape, a circular or cylindrical shape, etc.

Figure 2:
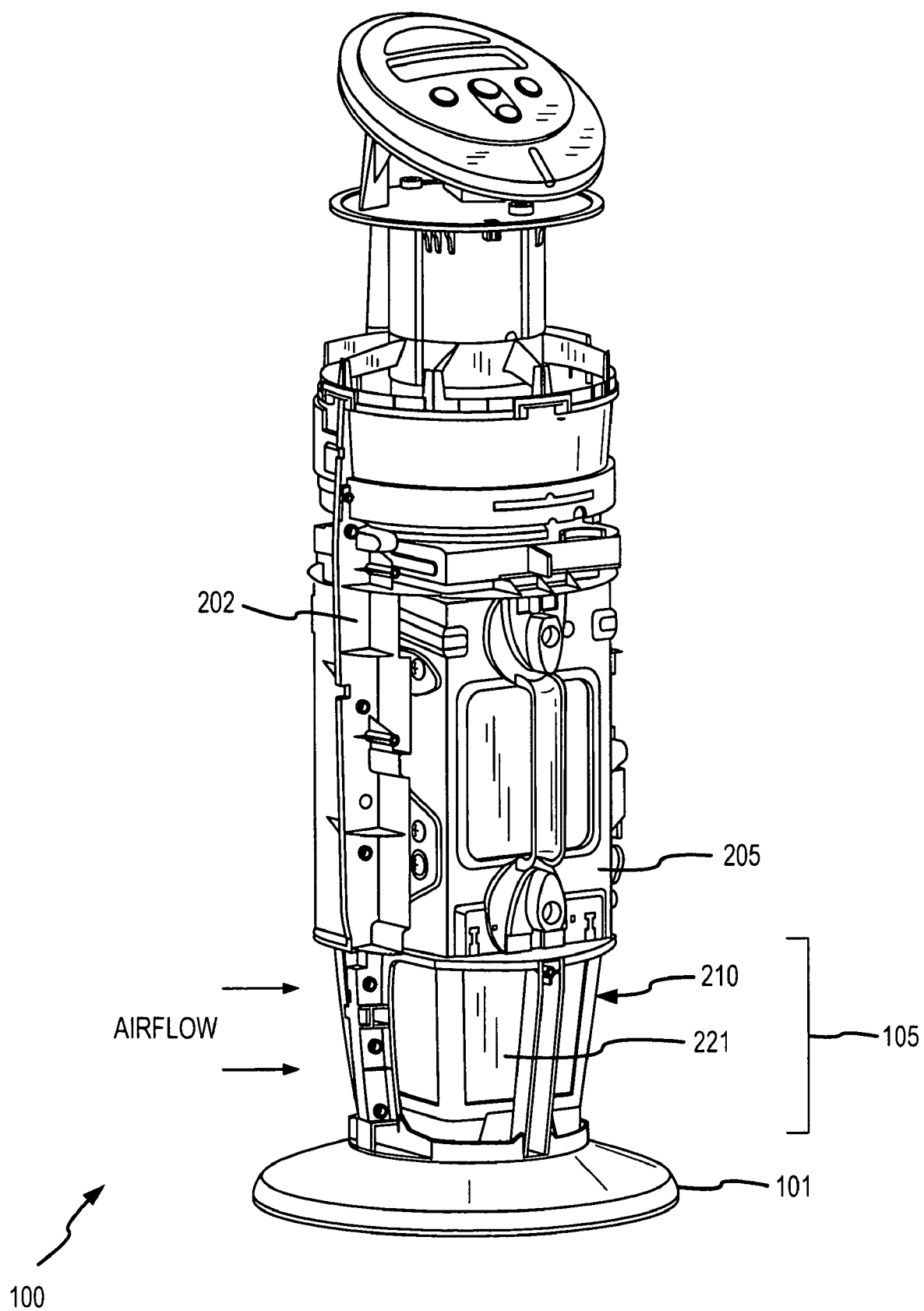
FIG. 2 shows the tower air cleaner of FIG. 1 without a shell.

FIG. 2 shows a portion of the tower air cleaner 100 of FIG. 1 without the shell 103. The tower air cleaner 100 includes an air cleaner frame 202, an electrostatic precipitator cell 205, a filter system 210, and an air moving device 209, among other things. The electrostatic precipitator cell 205 and the filter system 210 in this embodiment are received and held in the air cleaner frame 202. It should be noted that in the embodiment shown, the filter system 210 is located in the air cleaner frame 202 as a pre-filter, in a position corresponding to the air inlet 105 of FIG. 1. The airflow drawn in through the air inlet 105 passes through the filter system 210 and then passes through the electrostatic precipitator cell 205. It can be seen from the figure that the sides/filter panels 221 of the filter system 210 are substantially vertical, and therefore provide an optimal filtering area for the substantially horizontal inlet airflow.

Figure 3:
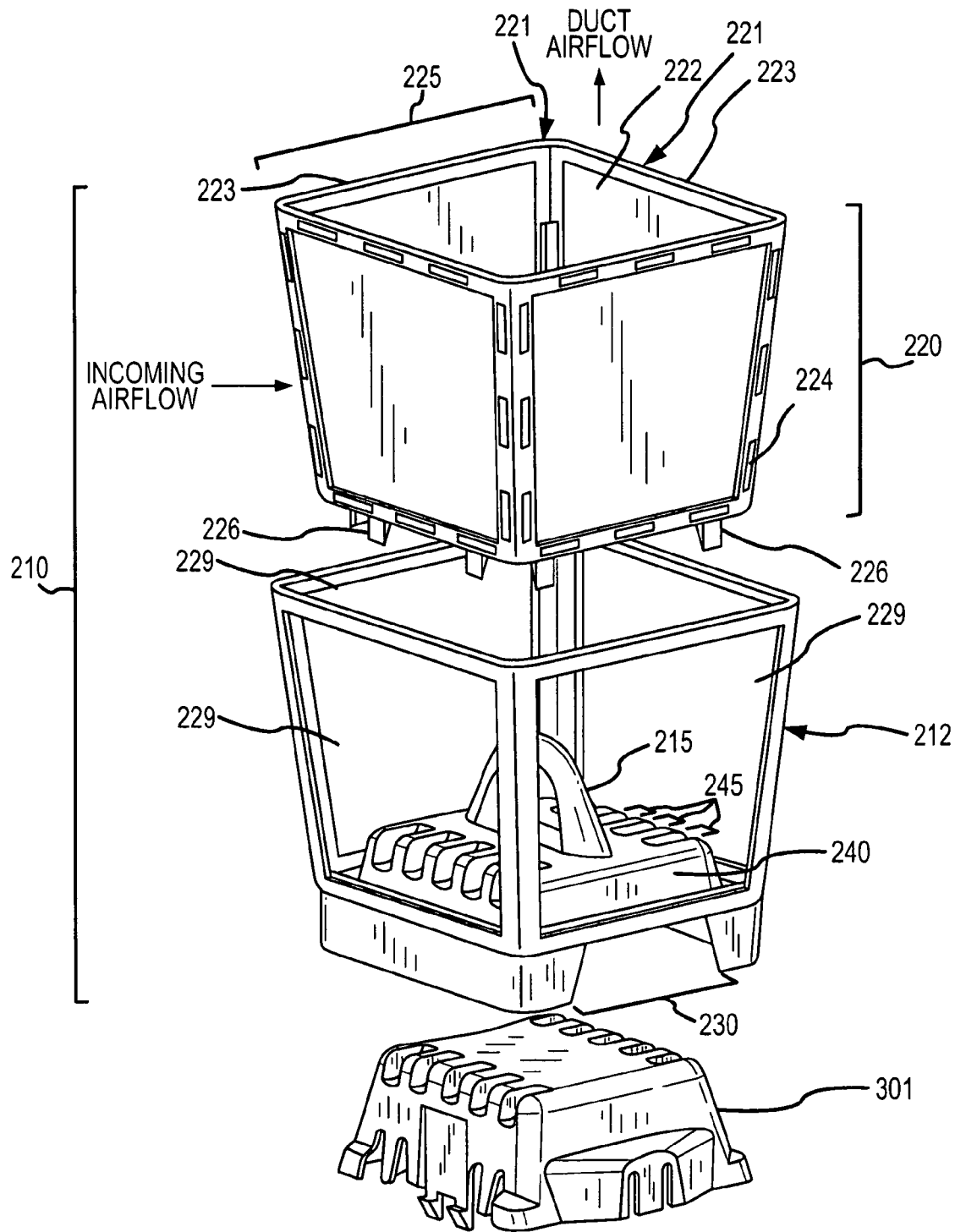
FIG. 3 shows detail of the filter system according to an embodiment of the invention.

FIG. 3 shows detail of the filter system 210 according to an embodiment of the invention. The filter system 210 in this embodiment comprises a frame 212 and a filter assembly 220 that is received in the frame 212. The assembled filter system 210 is positioned in the air cleaner 100 over a transformer housing 301. The transformer housing 301 can comprise a part of the base portion 101 or a component that can be affixed to the base portion 101 (see FIG. 8). The transformer housing 301 is not a part of the frame 212.

The filter system 210 provides a unitary filter system that is easy to install and remove. The filter system 210 can resist deformation under a high airflow. The filter system 210 can transition an incoming airflow by about 90 degrees in some embodiments. The transition angle can be varied as desired. The filter system 210 in one embodiment comprises a pre-filter system 210 located in front of a main air cleaning device, such as an electrostatic precipitator and/or other mechanical filter elements.

The frame 212 receives and holds the filter assembly 220. The frame 212 can comprise a rigid or semi-rigid frame that supports one or more filter panels 221. The frame 212 can include panel openings 229 that receive the filter panels 221. The frame 212 in one embodiment further includes a handle 215, a transformer cover 240, one or more clearance cut-outs 230 in the transformer cover 240, one or more vent apertures 245 in the transformer cover 240, and one or more retainer apertures 216 (see FIG. 4). The handle 215 can be gripped in order to insert, remove, or otherwise manipulate the filter system 210. The transformer cover 240 fits over the transformer housing 301. The transformer cover 240 can include the vent apertures 245, where the vent apertures 245 match up with corresponding vent apertures 345 in the transformer housing 301 (see also FIG. 4). The vent apertures 245 (and 345) allow a small cooling airflow portion to pass through the transformer housing 301 and cool an underlying transformer (not shown) of the air cleaner 100.

The filter assembly 220 includes one or more filter panels 221 that are configured to fit into the frame 212. A filter panel 221 can comprise a panel frame 223 and a filter element 222 that fits into the panel frame 223. The panel frame 223 can comprise a rigid or semi-rigid frame that supports the filter element 222. The panel frame 223 in one embodiment includes interlocking tabs 224 that engage to form the filter assembly 220. The interlocking tabs 224 are shown in more detail in FIG. 4. The panel frame 223 in one embodiment includes retainers 226 that engage the retainer apertures 216 in the frame 212 (see FIG. 4 and the accompanying discussion). The retainers 226 therefore retain the one or more filter panels 221 in the frame 212.

The filter element 222 can comprise any manner of any manner of desired filter element. In one embodiment, the filter element 222 comprises a fiber, a mesh, or a woven filter, for example. The filter element 222 can comprise a High Efficiency Particulate Air (HEPA) filter, an allergen air filter, an electrostatic air filter, an odor adsorbing, Volatile Organic Compound (VOC) removing filter (such as a charcoal filter, for example), an anti-microbial filter, etc. In addition, the filter element 222 can be treated with a germicide, fungicide, bactericide, insecticide, etc., in order to kill germs, mold, bacteria, viruses, and other airborne living organisms (including microorganisms).

In the embodiment shown, the filter assembly 220 includes four filter panels 221. The four filter panels 221 can be arranged to form a substantially rectangular top aperture 225. It should be understood that any number of filter panels 221 can be employed. For example, the filter assembly 220 can use two curved half-circle filter panels 221, can use three curved 120 degree filter panels 221, etc. In addition, the filter assembly 220 can use multiple filter panels 221, wherein the multiple filter panels 221 are arranged to form a roughly circular or roughly rectangular top aperture 225.

The filter panels 221 of the filter system 210 are substantially oriented in a three-dimensional configuration. The filter panels 221 are substantially perpendicular to the incoming airflow (see FIG. 2). After the incoming airflow passes through the filter panels 221, the incoming airflow can transition into a duct airflow that is substantially perpendicular to the incoming airflow. The filter panels 221 in one embodiment are substantially vertically oriented and the incoming airflow is substantially horizontally oriented, wherein the incoming airflow transitions into a substantially non-horizontal duct airflow in an air duct located in the air cleaner 100 (see FIG. 8).

In one embodiment, where the air cleaner 100 comprises a tower air cleaner (or other elongate configuration), the filter assembly 220 comprises one or more substantially vertically oriented filter panels 221. Alternatively, for other air cleaner configurations, the one or more filter panels 221 can be positioned in other orientations, such as horizontal for a horizontally oriented air duct, etc.

Figure 4:
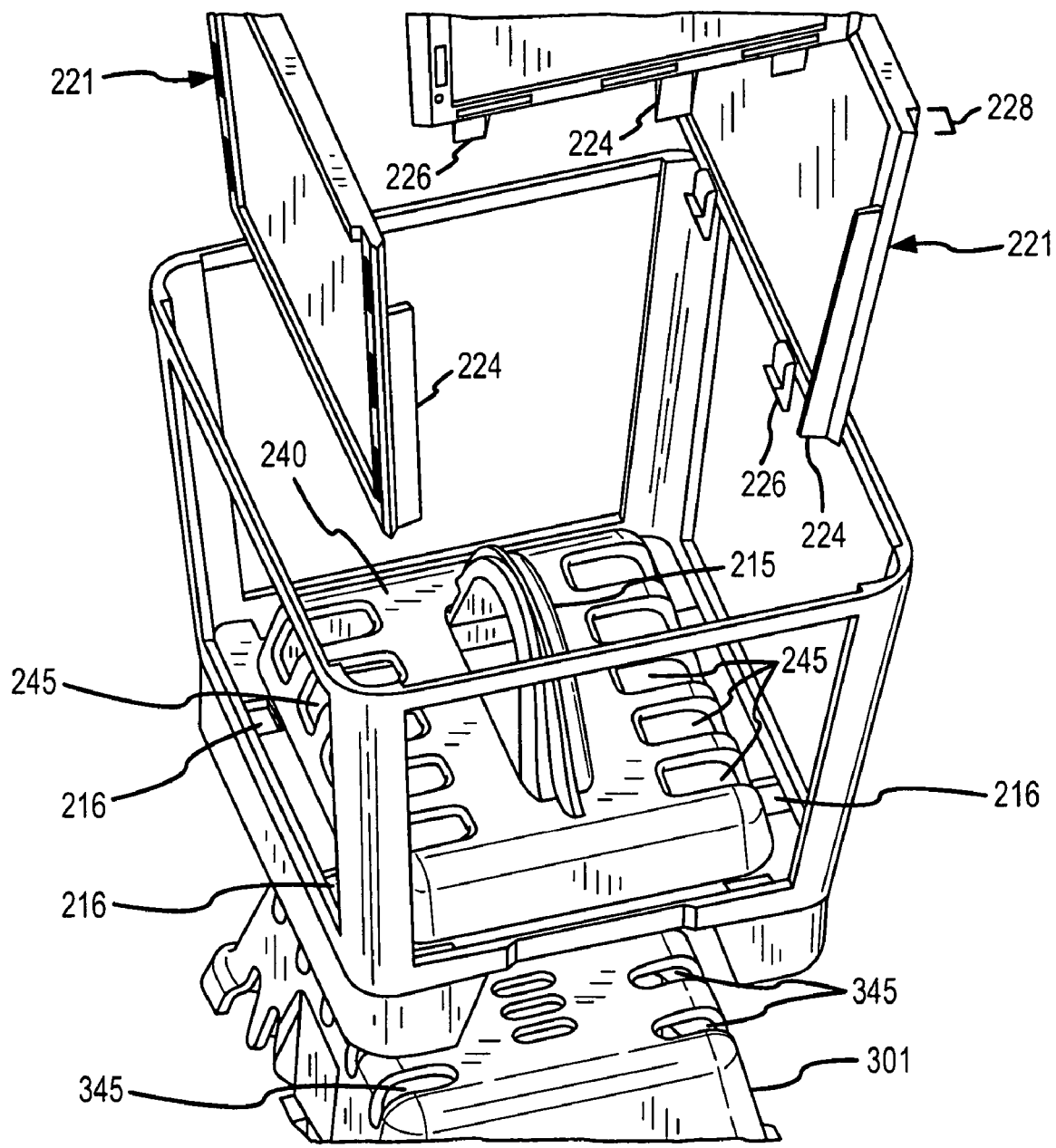
FIG. 4 shows the filter assembly wherein the filter assembly is not in place in the frame and wherein the filter panels are not assembled into the frame.

FIG. 4 shows the filter assembly 220 wherein the filter assembly 220 is not in place in the frame 212 and wherein the filter panels 221 are not assembled into the frame 212. The retainer apertures 216 can be seen in this figure. The retainer apertures 216 can receive and hold the retainers 226 on the bottom of the filter panels 221. In the embodiment shown, each filter panel 221 includes two retainers 226. However, the number of retainers 226 (and retainer apertures 216) can be varied as desired.

This figure also shows the vent apertures 245, which are formed on the transformer cover 240. In the embodiment shown, the vent apertures 245 are designed to substantially align with corresponding vents 345 on the transformer housing 301. It should be noted that the vent apertures 245 (and the corresponding vents 345) can be varied in size and number according to the cooling needs of the transformer.

Also shown in this figure are cut-ins 228 that enable the edges of the filter panels 221 to fit into the frame openings 229 in the frame 212. Therefore, a filter panel 221 is inserted down into the interior of the frame 212 and then outward into a frame opening 229.

Figure 5:
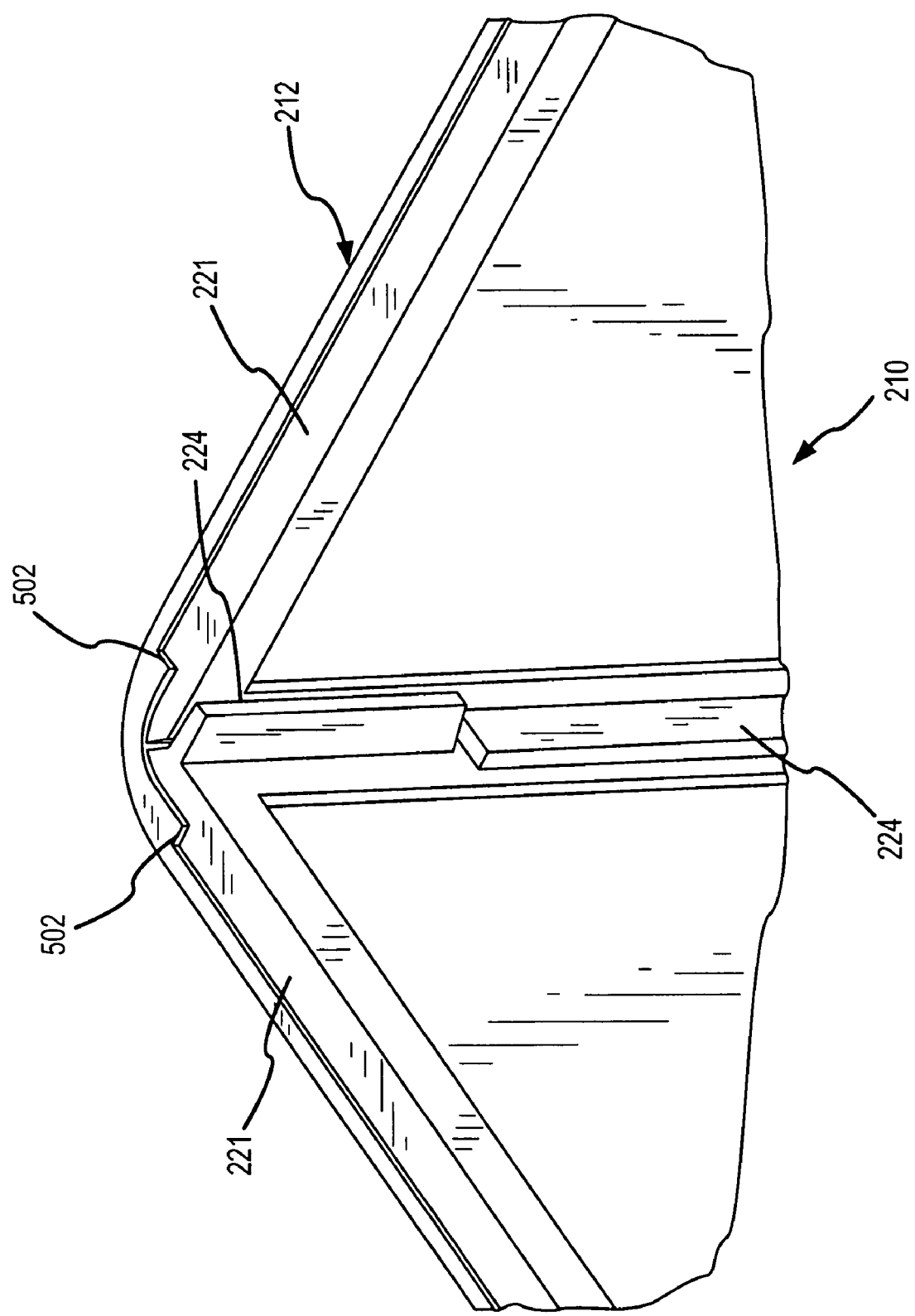
FIG. 5 shows a corner view of two filter panels assembled into the frame according to an embodiment of the invention.

FIG. 5 shows a corner view of two filter panels 221 assembled into the frame 212 according to an embodiment of the invention. In this embodiment of the filter assembly 220, four filter panels 221 are used. The frame 212 in some embodiments can include overhang lips 502 that fit over and trap the filter panels 221 when assembled to the frame 212. Furthermore, the interlocking tabs 224 prevent the filter panels 221 from moving inward when in place in the frame 212. This creates a fixed assembly structure that maintains its shape even when airflow is drawn through the filter panels 221.

Figure 6:
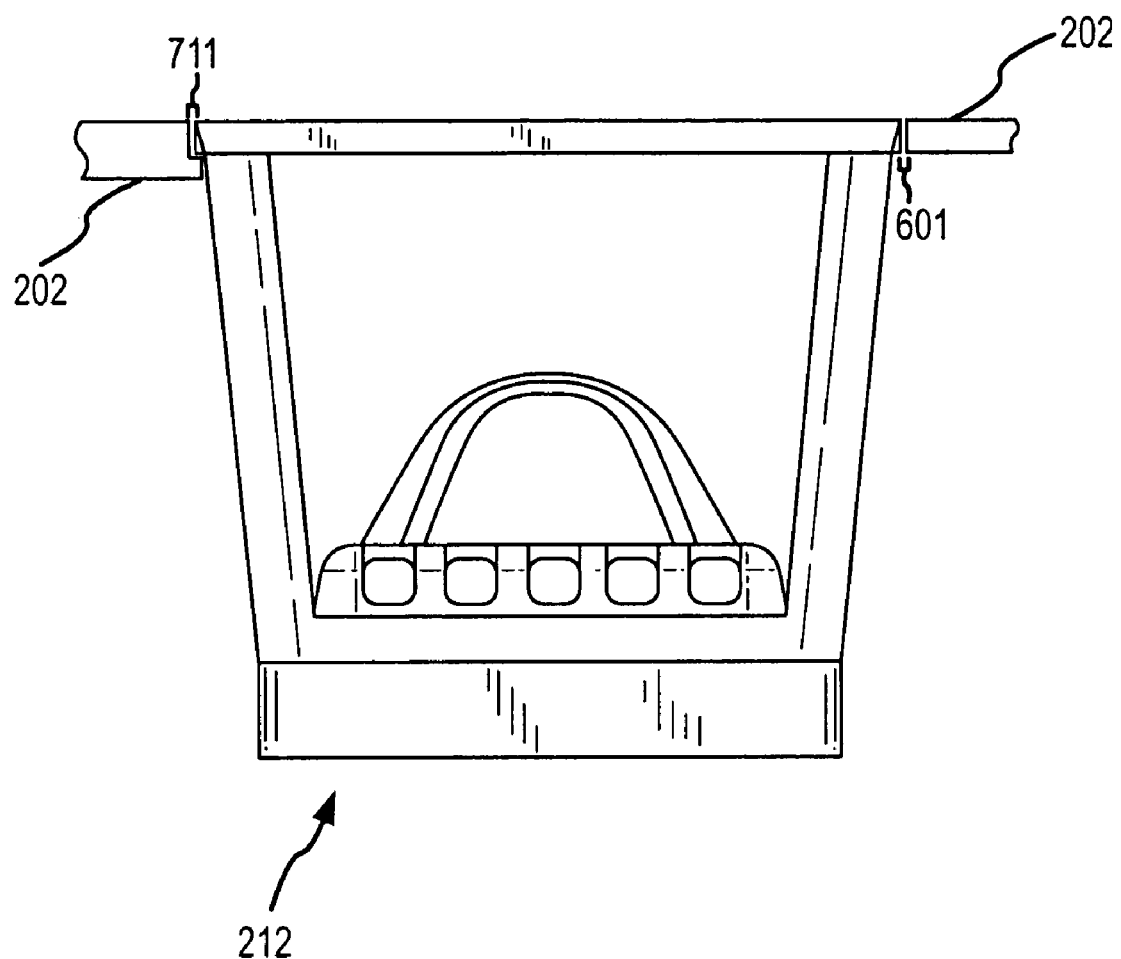
FIG. 6 shows just the frame of the pre-filter system according to an embodiment of the invention.

FIG. 6 shows just the frame 212 of the filter system 210 according to an embodiment of the invention. In some embodiments, the frame 212 includes a top lip 601, as shown on the left side of the figure. The top lip 601 can rest on a corresponding ledge 711 of the air cleaner frame 202 (see FIG. 7). The top lip 601, when in position on the ledge 711, prevents air from flowing around the filter system 210 and into the electrostatic precipitator cell chamber 715 without going through a filter panel 221. Alternatively, in some embodiments the top of the frame 212 can abut or fit against an end of the air cleaner frame 202, as shown on the right side of the figure.

Figure 7:
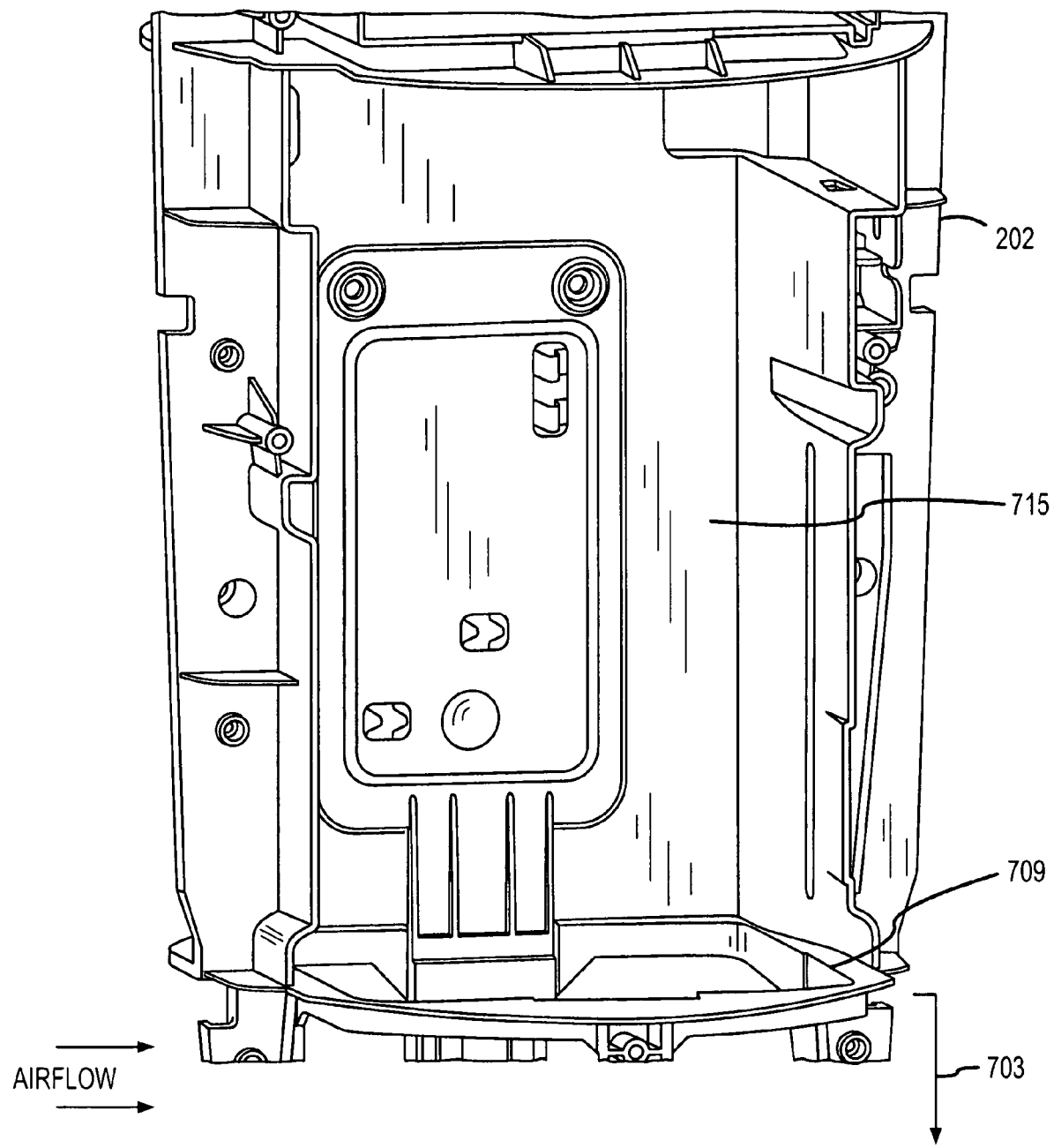
FIG. 7 shows the air cleaner frame according to an embodiment of the invention.

FIG. 7 shows the air cleaner frame 202 according to an embodiment of the invention. The air cleaner frame 202 includes a pre-filter chamber 703, a pre-filter aperture 709, and an air duct 715 in communication with the pre-filter aperture 709 and the pre-filter chamber 703. The air duct 715 receives the airflow that has passed through the filter system 210. The filter system 210 can be employed as a pre-filter. In a pre-filter embodiment, the filter system 210 is inserted down into the pre-filter aperture 709, and rests on a bottom surface (or on devices attached to the bottom surface, such as the transformer housing 301, see FIG. 8). Therefore, when in position, the filter system 210 rests substantially completely in the pre-filter chamber 703. As was previously discussed, the top lip 601 of the frame 212 can be receive by and rest on a ledge 711 (not shown) of the pre-filter aperture 709 or can fit into the pre-filter aperture 709 and substantially seal against the edges of the pre-filter aperture 709. The air duct 715 is located adjacent to the pre-filter aperture 709, and receives the airflow that has passed through the filter system 210. It can be seen from the figure that in this embodiment, incoming air will be drawn substantially horizontally into the pre-filter chamber 703 and into the filter system 210 (not shown). It should be noted that the incoming airflow can enter the pre-filter chamber 703 over substantially 360 degrees around the air cleaner 100.

Figure 8:
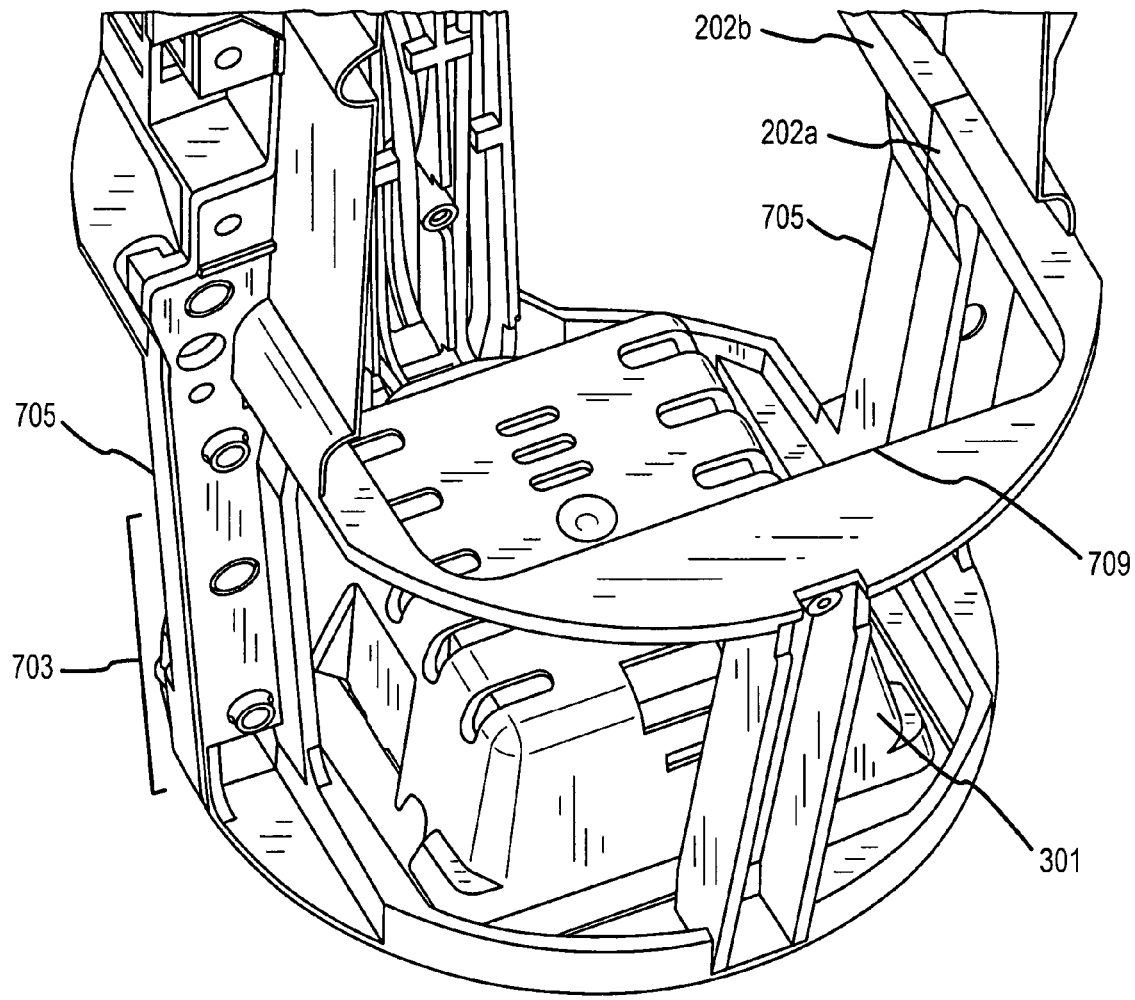
FIG. 8 shows detail of the air cleaner wherein the air cleaner frame is assembled to the base portion.

FIG. 8 shows detail of the air cleaner 100 wherein the air cleaner frame 202 is assembled from two frame halves 202*a* and 202*b*. The air cleaner frame 202 can comprise a single frame piece or can be assembled from multiple frame portions. This figure also shows the transformer housing 301 and a plurality of support legs 705. The transformer cover 240 of the frame 212 can rest on the transformer housing 301.

Figure 9:
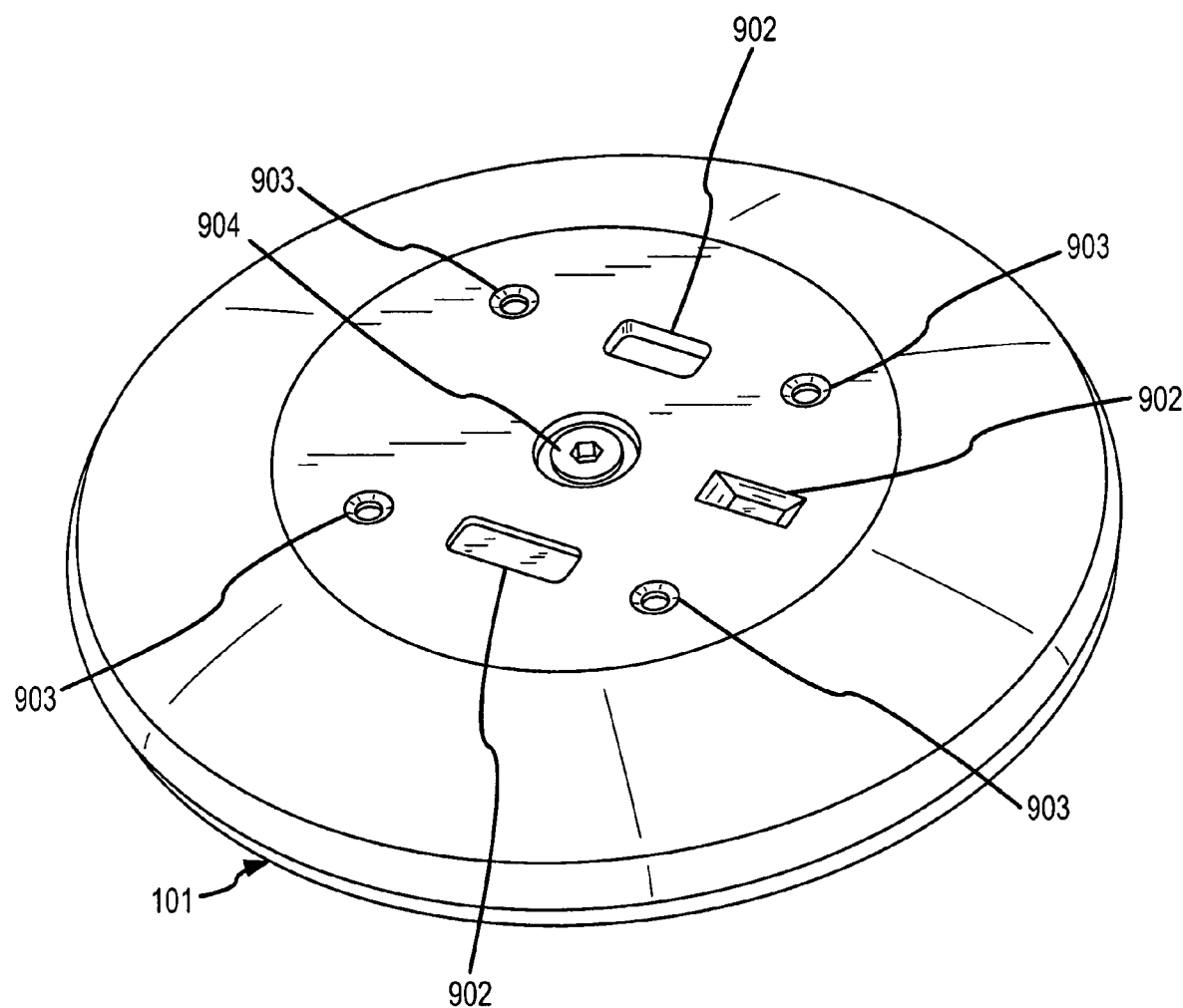
FIG. 9 shows the base portion according to an embodiment of the invention.

FIG. 9 shows the base portion 101 according to an embodiment of the invention. The base portion 101 includes one or more clearance depressions 902, one or more fastener apertures 903, and an access port 904.

The one or more clearance depressions 902 correspond to the one or more transformer retainer device apertures 1106 of the stud plate 1102. The clearance depressions 902 can be of any size, shape, or depth. The one or more clearance depressions 902 can accommodate protruding air cleaner components. For example, the clearance depressions 902 can receive a portion of a fastener device, such as a portion of a retainer device 1305 (see FIG. 13). In addition, a clearance depression 902 can receive a corresponding tab or protrusion 1006 formed on the base cover 1002 (see FIG. 10). This interlocking fit can operate to prevent rotation or movement of the base cover 1002 on the base portion 101 and can enable easier alignment for assembly of the base portion 101.

The fastener apertures 903 are used to attach air cleaner components to the base portion 101, such as attaching the air cleaner frame 202 (or other components) to the tower portion 102, for example. The fastener apertures 903 in one embodiment are countersunk, as shown. The fastener apertures 903 can be substantially smooth or can be threaded, for example.

The access port 904 can be used to add or remove filler material to the base portion 101 where the base portion 101 comprises a hollow structure. The filler material can comprise a heavy filler material that increases the weight of the base portion 101 and increases the stability of the air cleaner 100, for example. The access port 904 therefore can include an access hole and a plug that substantially seals the access hole. In one embodiment, the access hole and plug are threaded, although alternatively the plug can fit into the access hole in a friction fit, etc.

Figure 17:
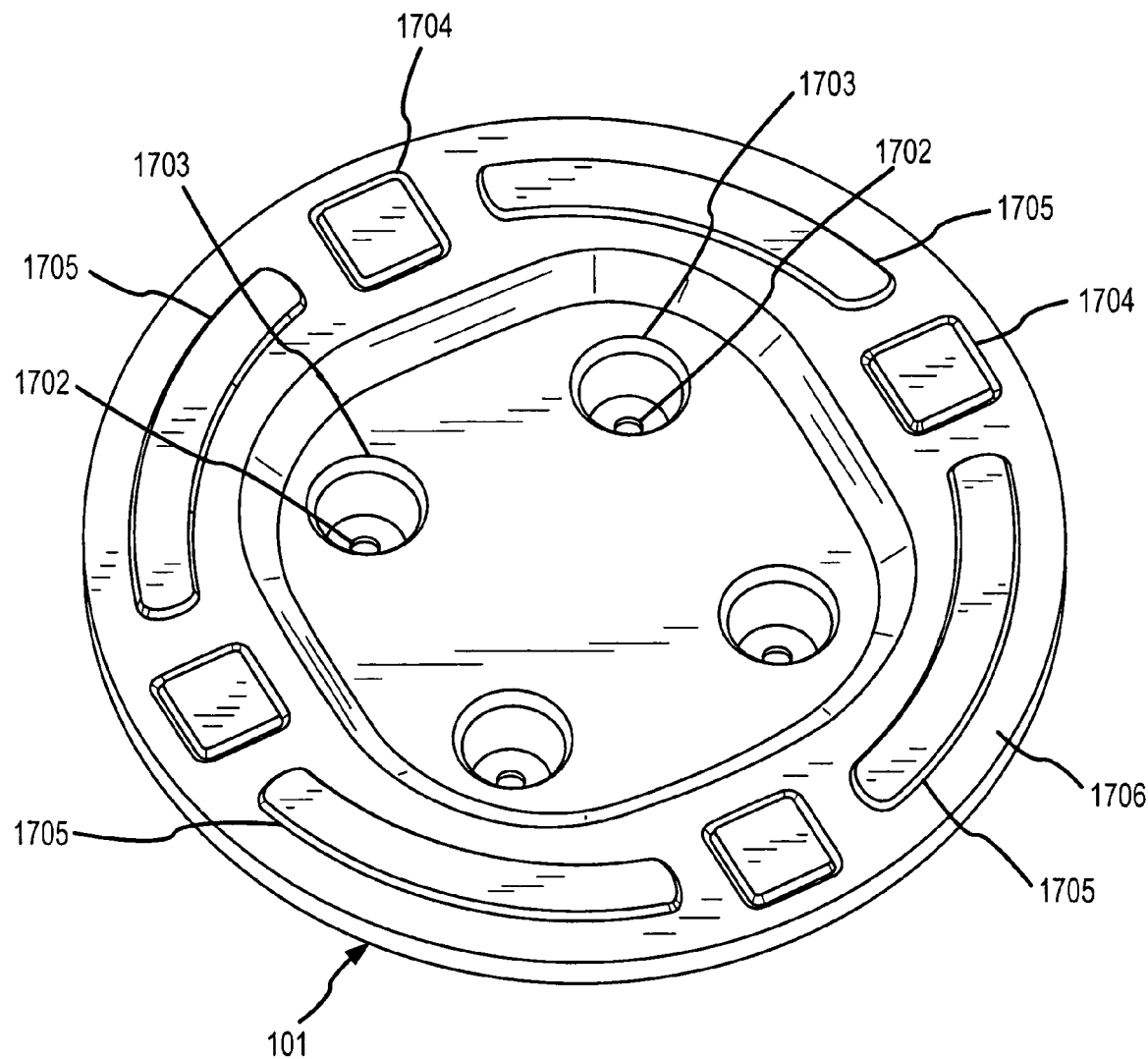
FIG. 17 shows a bottom of the base portion according to an embodiment of the invention.

In some embodiments, the base portion 101 comprises a unitary piece, such as a substantially hollow shell, for example (see FIG. 17). A hollow volume of the base portion 101 can be filled with a heavy ballast material, such as with a granular material like sand, for example. Alternatively, a base top portion can comprise a top piece that mates with a bottom piece (see FIGS. 18-19) in order to form a completed base portion 101.

Figure 10:
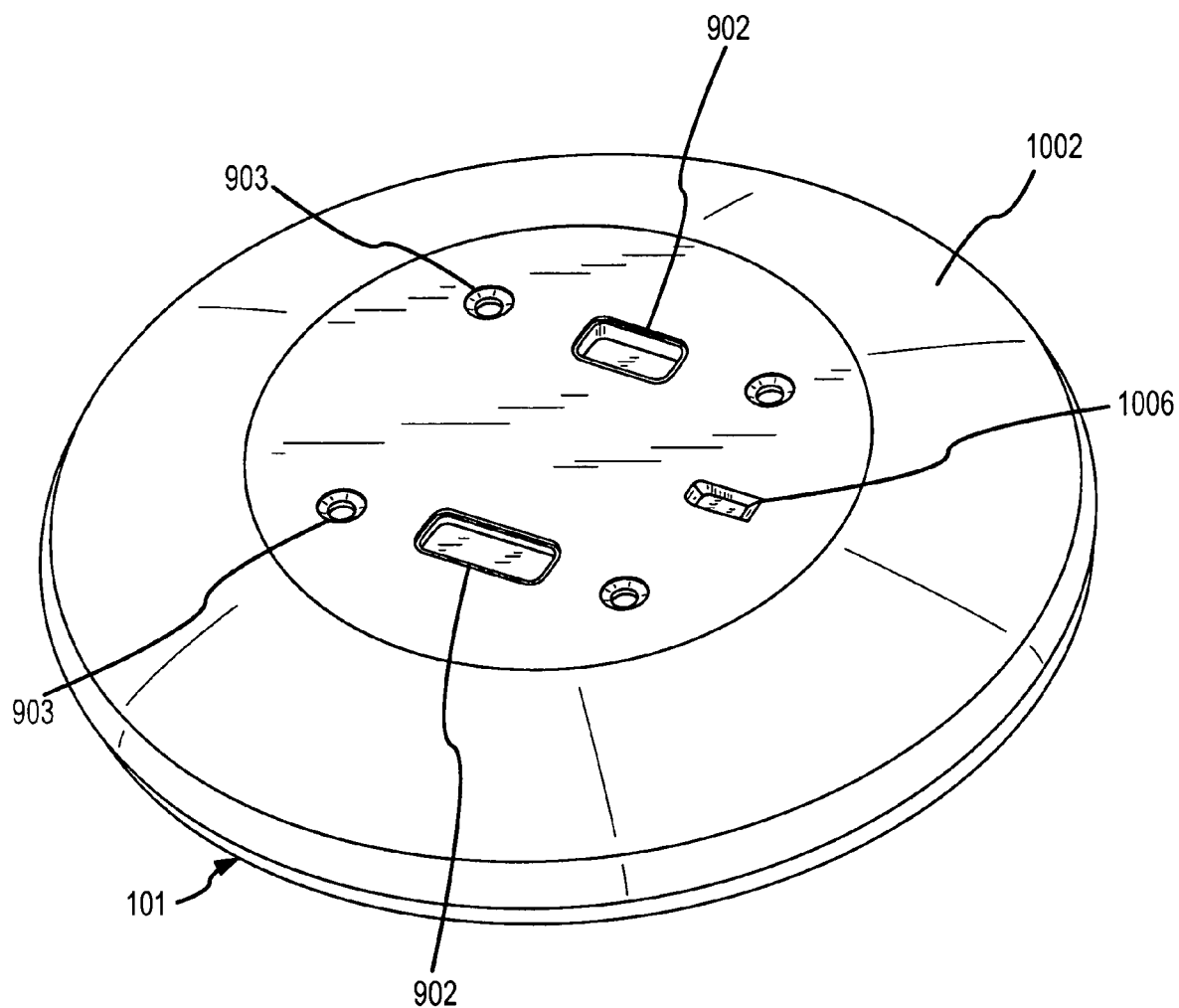
FIG. 10 shows a base cover in place over at least a portion of a top region of the base portion.

FIG. 10 shows a base cover 1002 in place over at least a portion of a top region of the base portion 101. The base cover 1002 can be included in order to improve the finish/appearance of the air cleaner 100. The base cover 1002 can be included in order to improve the durability/hardness of the air cleaner 100. It should be understood that the base cover 1002 can be assumed to be in position on the base portion 101 of all subsequent figures that include the base portion 101. The base cover 1002 can be formed of any material, including metal, plastic, glass, wood, stone, etc., or combinations thereof.

Figure 11:
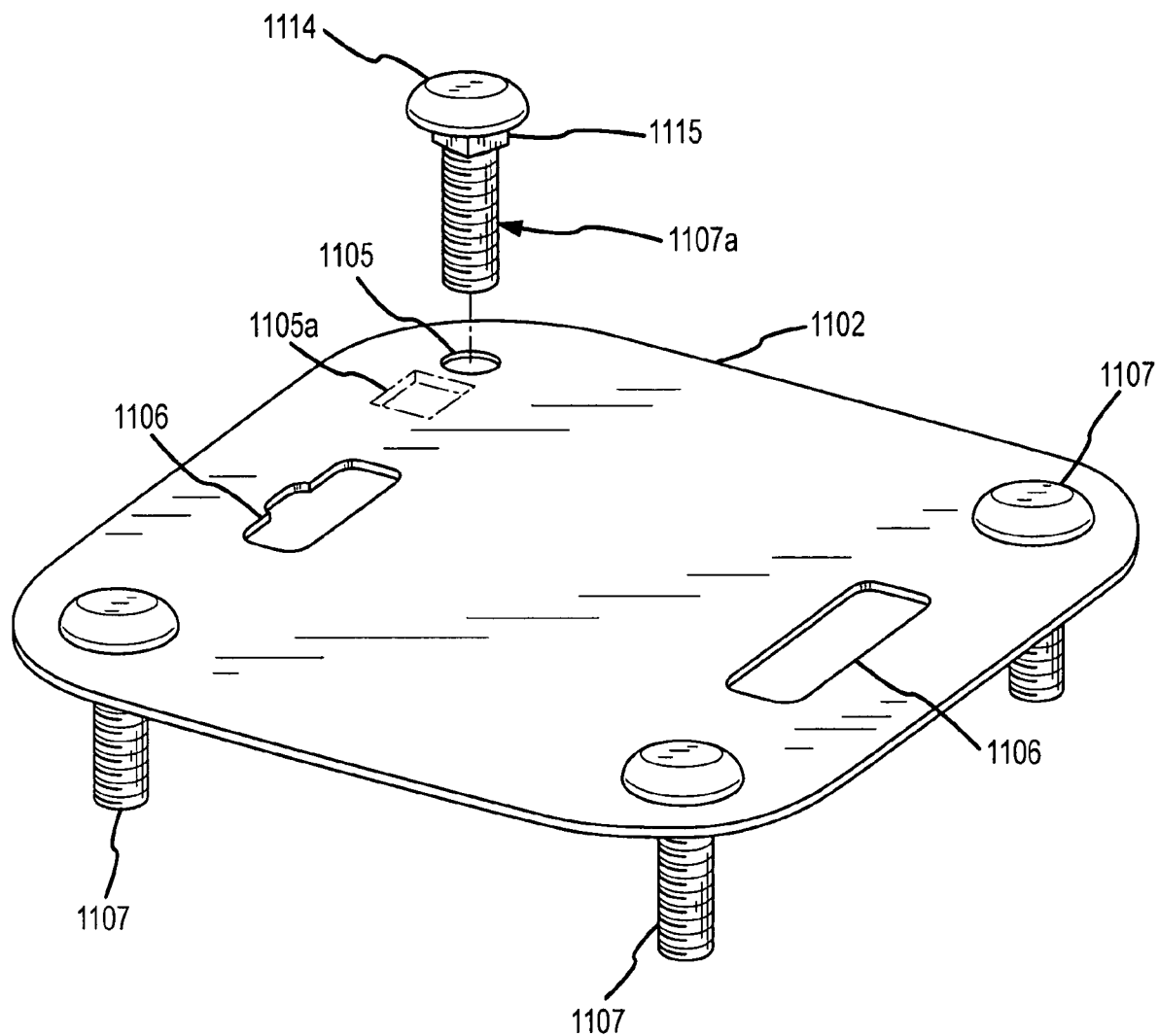
FIG. 11 shows a stud plate according to an embodiment of the invention.

FIG. 11 shows a stud plate 1102 according to an embodiment of the invention. The stud plate 1102 includes one or more transformer retainer device apertures 1106 and one or more base fastener apertures 1105 that receive one or more corresponding base fasteners 1107. It should be understood that a base fastener aperture 1105 can be of any desired shape or size.

Figure 13:
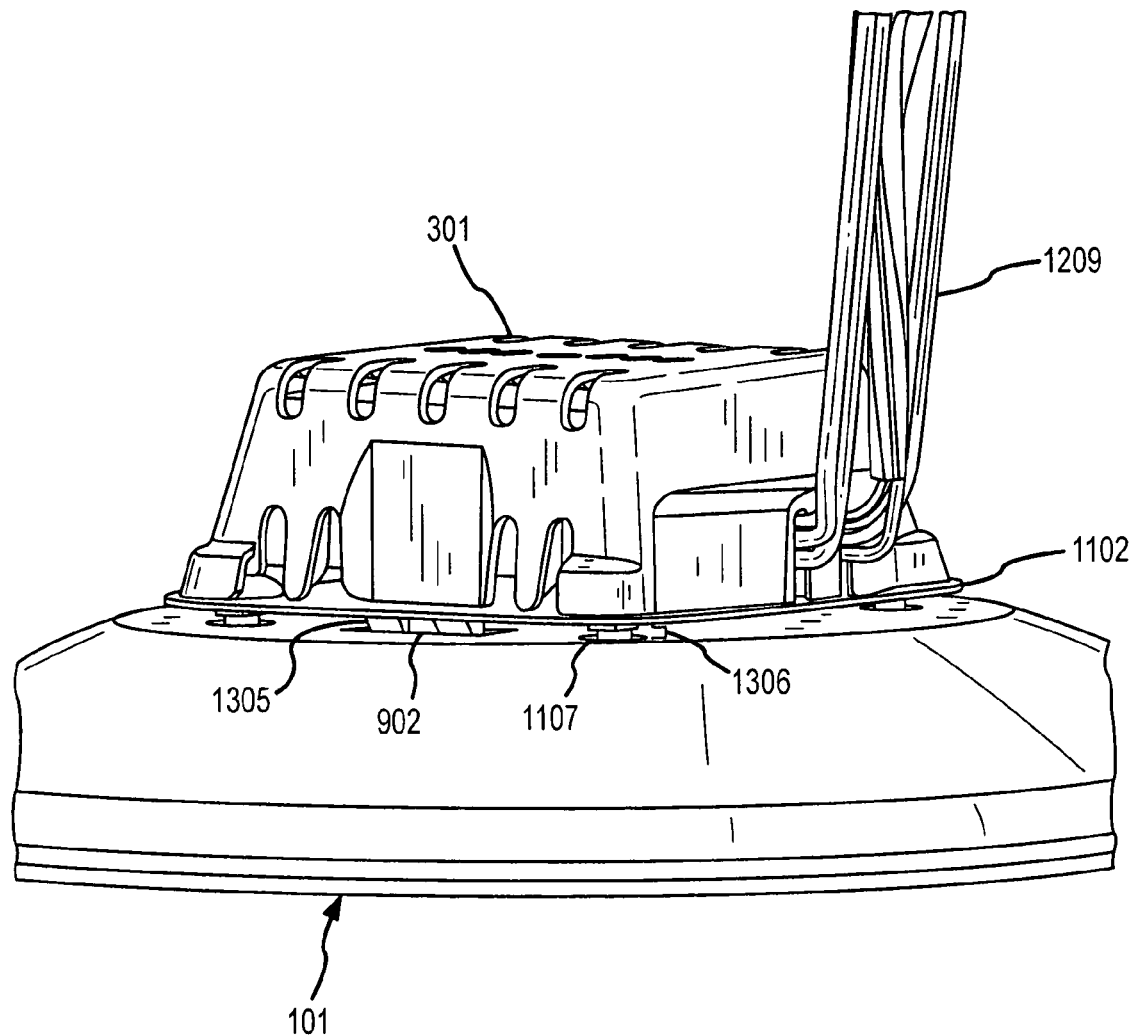
FIG. 13 shows the assembled transformer housing and stud plate further assembled to the base portion.

The one or more transformer retainer device apertures 1106 receive one or more corresponding retainer devices 1305 of the transformer housing 301 (see FIG. 13). A transformer retainer device aperture 1106 can have any desired shape or size. A retainer device 1305 can engage a transformer retainer device aperture 1106 in a friction fit, spring fit, or snap fit, for example.

The one or more base fasteners 1107 can comprise any manner of fastener device. In the embodiment shown, a base fastener 1107 comprises a threaded fastener, such as a bolt that receives a threaded nut. In one embodiment, the base fastener 1107 can comprises a carriage bolt 1107*a* that includes a head 1114 and a rectangular shank 1115 (where a corresponding base fastener aperture 1105*a* comprises a square aperture).

The one or more base fastener apertures 1105 can comprise any size and shape. The one or more base fastener apertures 1105 can comprise substantially circular apertures, as shown.

Alternatively, the base fastener apertures 1105 can comprise rectangular or square apertures, etc. The base fastener apertures 1105 can receive shaped portions of a base fastener 1107, such as a shank 1115 of a carriage bolt 1107a, for example.

Figure 12:
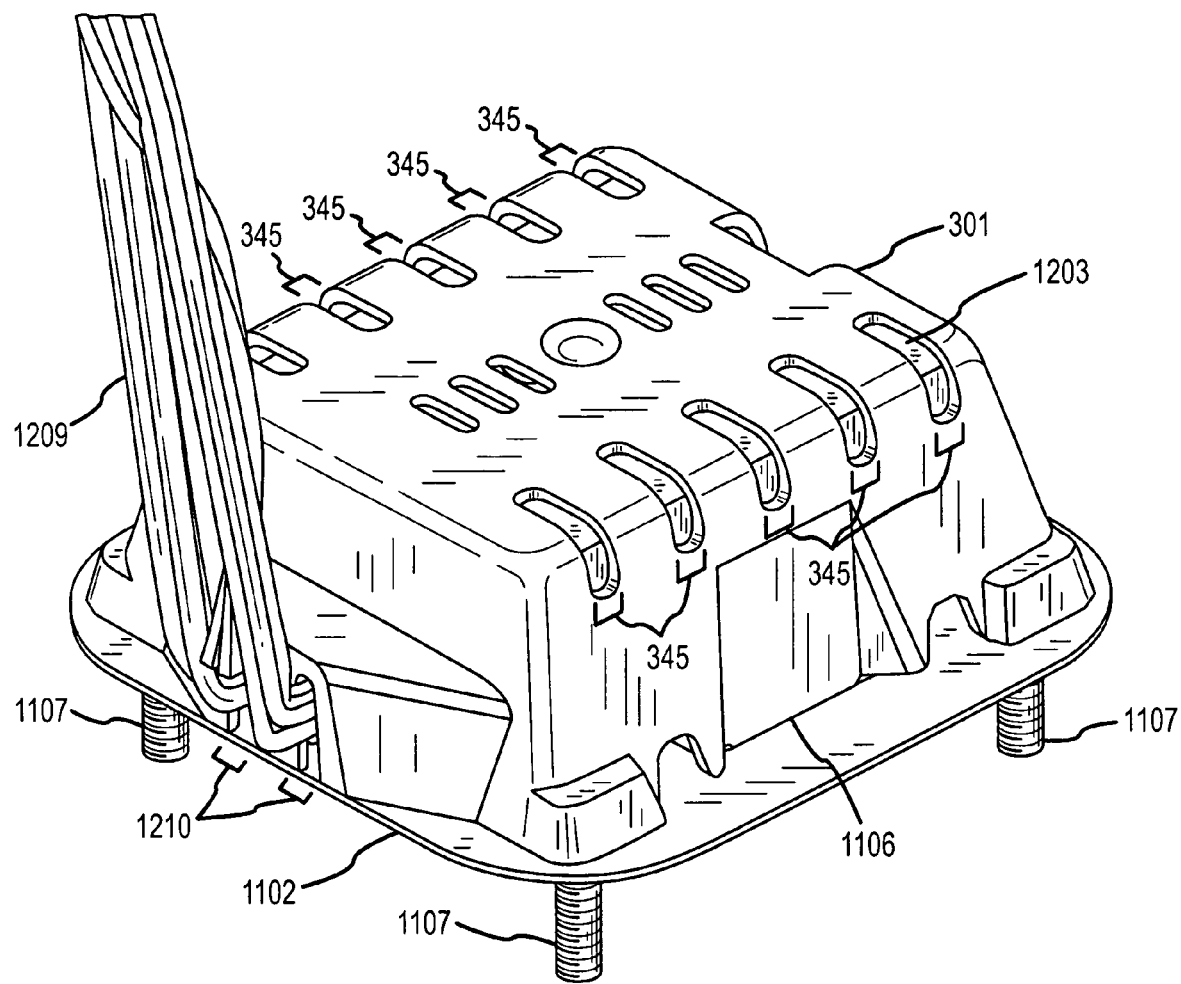
FIG. 12 shows a transformer and the transformer housing assembled to the stud plate according to an embodiment of the invention.

FIG. 12 shows a transformer 1203 and the transformer housing 301 assembled to the stud plate 1102 according to an embodiment of the invention. The transformer housing 301 includes one or more retainer devices 1305 (see FIG. 13) that engage the one or more transformer retainer device apertures 1106 of the stud plate 1102. The one or more retainer devices 1305 engage the one or more transformer retainer device apertures 1106 when the transformer housing 301 is assembled to the stud plate 1102. Consequently, the transformer housing 301 traps and retains the transformer 1203 on the stud plate 1102. In one embodiment, the stud plate 1102 includes two transformer retainer device apertures 1106 and the transformer housing 301 includes two corresponding retainer devices 1305. The transformer housing 301 in one embodiment snaps onto the stud plate 1102. The transformer housing 301 therefore traps and retains the transformer 1203 against the stud plate 1102.

It can be seen from this figure that the transformer housing 301 can include one or more vent apertures 345 for cooling of the transformer 1203, as previously discussed. In addition, the transformer housing 301 can include one or more wiring apertures 1210 that accommodate a wiring harness 1209 of the transformer 1203.

FIG. 13 shows the assembled transformer housing 301 and stud plate 1102 further assembled to the base portion 101. This figure shows the one or more retainer devices 1305 that attach the transformer housing 301 to the stud plate 1102. The base portion 101 in this embodiment includes the clearance depressions 902 that receive the ends of the one or more retainer devices 1305.

It can be see from this figure that a base fastener 1107 can include a stand-off portion 1306. The stand-off portion 1306 maintains a predetermined spacing between the stud plate 1102 and the base portion 101. The spacing can be used to attach the air cleaner frame 202 (see FIGS. 14-16 and the accompanying discussion below).

Figure 14:
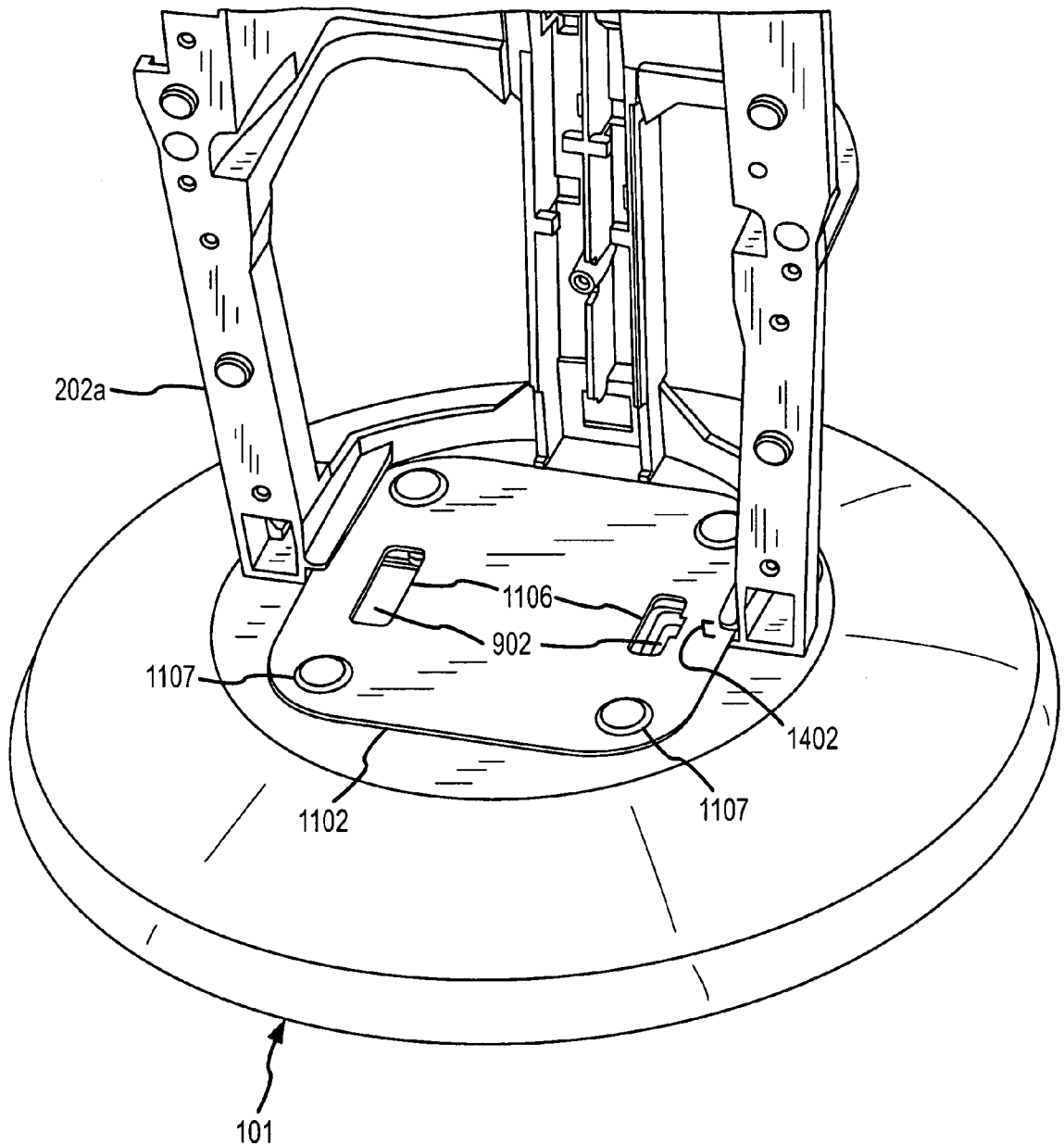
FIG. 14 shows the stud plate attached to the base portion without the transformer and the transformer cover (such as before attachment of these two components).

FIG. 14 shows the stud plate 1102 attached to the base portion 101 without the transformer 1203 and the transformer housing 301 (such as before attachment of these two components). A first frame portion 202a has been engaged with the stud plate 1102. The first frame portion 202a includes rails 1402 that trap an edge portion of the stud plate 1102. The rails 1402 in one embodiment can slide over the edges of the stud plate 1102 in order to affix to the stud plate 1102. The first frame portion 202a can therefore slide onto and off of the stud plate 1102. The first frame portion 202a can therefore be removably attached to the stud plate 1102, while the stud plate 1102 can be removably attached to the base portion 101. Two frame portions 202a-202b can completely trap the stud plate 1102 (see FIG. 16 and the accompanying discussion).

Figure 15:
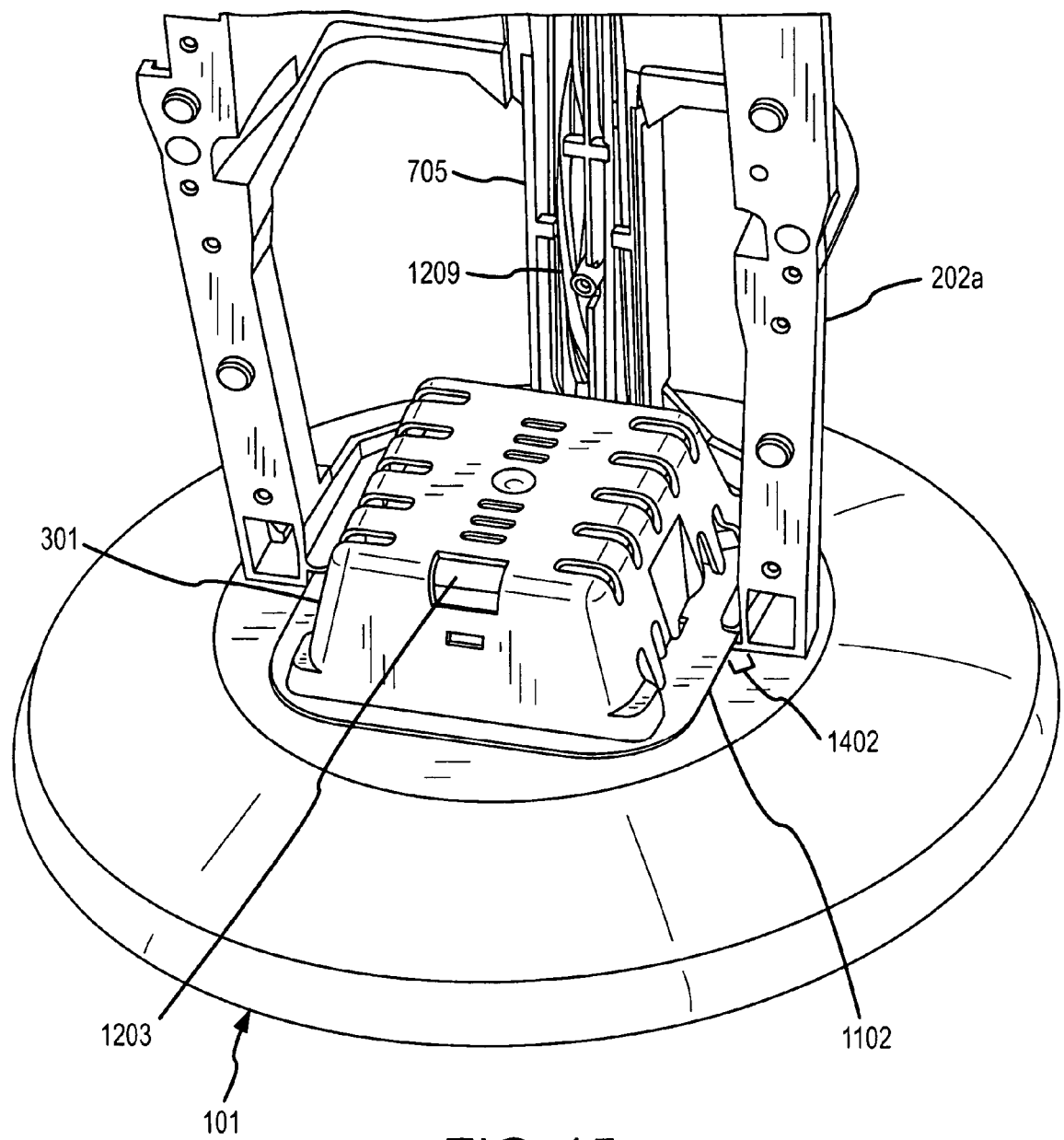
FIG. 15 shows the transformer and the transformer housing in position on the stud plate and inside the first frame portion.

FIG. 15 shows the transformer 1203 and the transformer housing 301 in position on the stud plate 1102 and inside the first frame portion 202a. The transformer 1203 and the transformer housing 301 can be attached before or after the first frame portion 202a is put in place on the stud plate 1102. The wiring harness 1209 can be received in a support leg 705.

Figure 16:
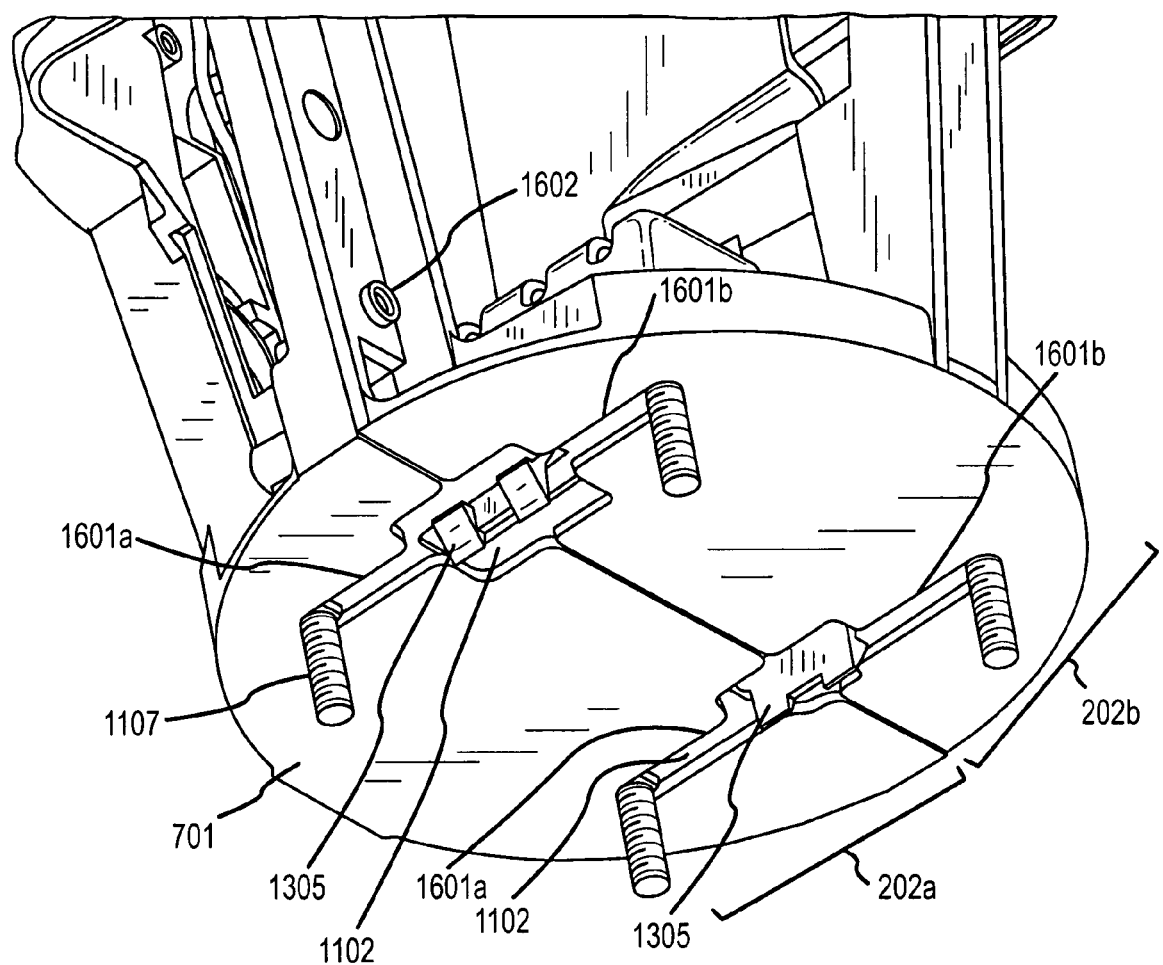
FIG. 16 shows the first frame portion joined to a second frame portion.

FIG. 16 shows the first frame portion 202a joined to a second frame portion 202b. In one embodiment, the two joined frame portions 202a and 202b completely trap and retain the stud plate 1102. The two frame portions 202a and 202b can include the rails 1402 that receive edge portions of the stud plate 1102 (see FIGS. 14-15).

In the embodiment shown, the two frame portions 202a and 202b comprise substantially half portions, but it should be understood that the portions can be of various sizes and can include various features of the air cleaner frame 202. The two frame portions 202a and 202b can be permanently or removably attached. In the embodiment shown, at least one of the frame portions can include one or more frame fastener apertures 1602 that receive some manner of fastener, such as a threaded fastener, for example. Alternatively, the two frame portions 202a and 202b can be affixed in some other manner, including clamps, springs, welds, adhesives, etc.

The two frame portions 202a and 202b can further include the frame clearance openings 1601a and 1601b. The frame clearance openings 1601a and 1601b enable the base fasteners 1107 to pass through the first and second frame portions 202a and 202b. In addition, the frame clearance openings 1601a and 1601b provide clearance for the retainer devices 1305.

FIG. 17 shows a bottom of the base portion 101 according to an embodiment of the invention. The base portion 101 in this embodiment includes one or more fastener apertures 1702 corresponding to the one or more base fastener apertures 1105 in the stud plate 1102. The base fasteners 1107 pass through the base fastener apertures 1105 in the stud plate 1102 and through the fastener apertures 1702 of the base portion 101. Therefore, in some embodiments, the stud plate 1102 is removably affixed to the base portion 101 by the one or more base fasteners 1107.

The base portion 101 can further include one or more fastener recesses 1703 formed around the one or more fastener apertures 1702. The fastener recesses 1703 provide clearance for the base fasteners 1107 (see FIG. 11) and any manner of corresponding fastener component that affixes to a base fastener 1107, such as a threaded nut, for example.

The base portion 101 can further include one or more feet 1704 and one or more raised areas 1705 located on a bottom surface 1706 of the base portion 101. The feet 1704 can extend from the bottom surface 1706. The one or more feet 1704 can be formed of any desired material. In one embodiment, the one or more feet 1704 are formed of an at least partially resilient material that tends to cushion the air cleaner 100 and that resists slipping. The one or more feet 1704 can provide all contact surface between the air cleaner 100 and an underlying support surface. The raised areas 1705 allow a portion of the base portion 101 to sink into high plush pile carpets, for example. The raised areas 1705 therefore improve stability of the air cleaner 100 on surfaces that are at least partially soft, compressible, or uneven.

Figure 18:
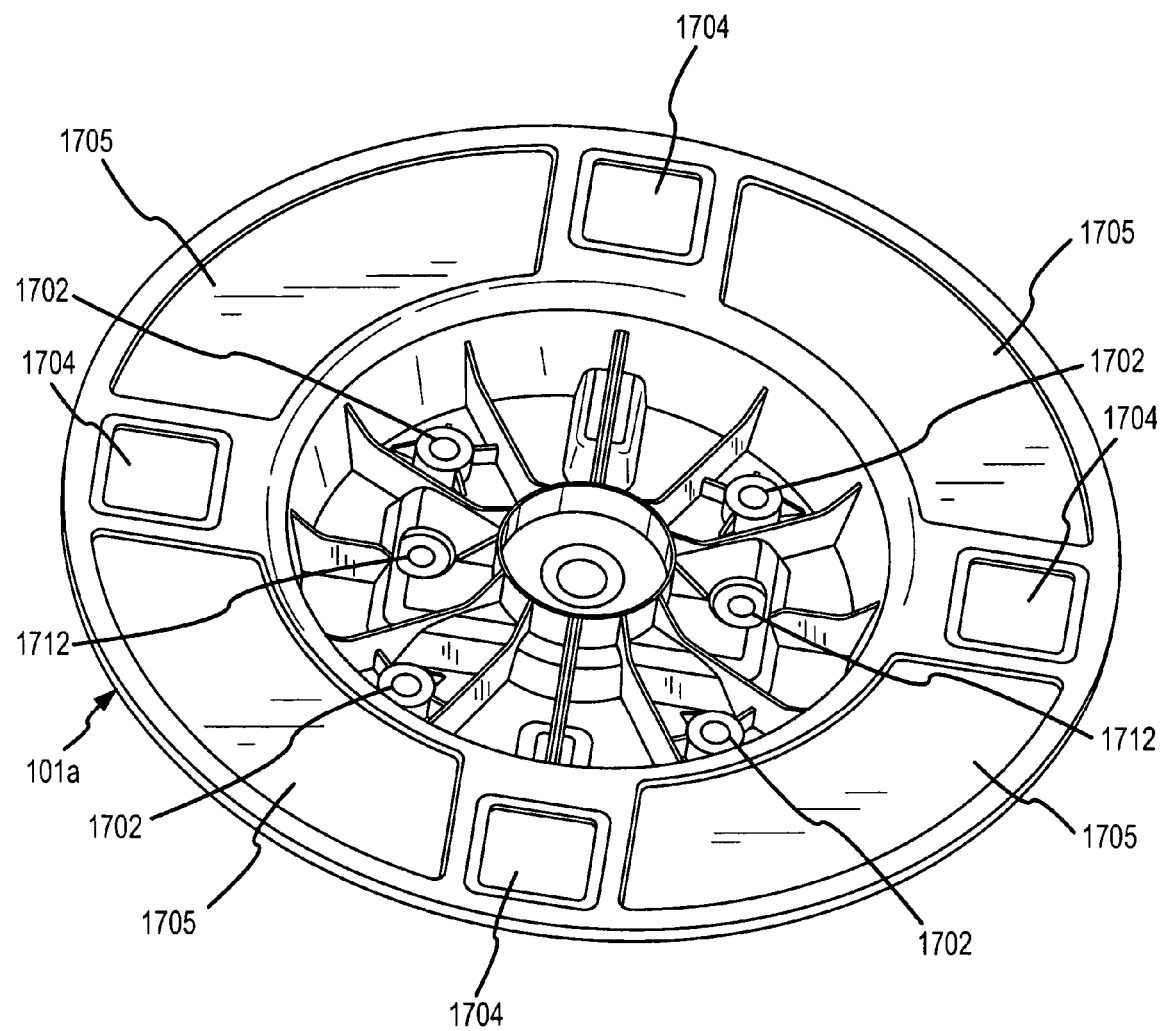
FIG. 18 shows an under side of a base bottom half according to an embodiment of the invention.

FIG. 18 shows an under side of a base bottom half 101a according to an embodiment of the invention. The base bottom portion 101a can mate to a corresponding upper half, such as shown in FIG. 9. The base bottom portion 101a includes fastener apertures 1702. The fastener apertures 1702 receive base fasteners 1107 that fasten the stud plate 1102 to the assembled base portion 101.

The base bottom portion 101a also includes one or more fastener apertures 1712. The one or more fastener apertures 1712 in an alternate embodiment enable additional threaded fasteners to pass through the base portion 101 and engage corresponding apertures in the stud plate 1102 (not shown in FIG. 11) or engage corresponding apertures in the transformer housing 301.

Figure 19:
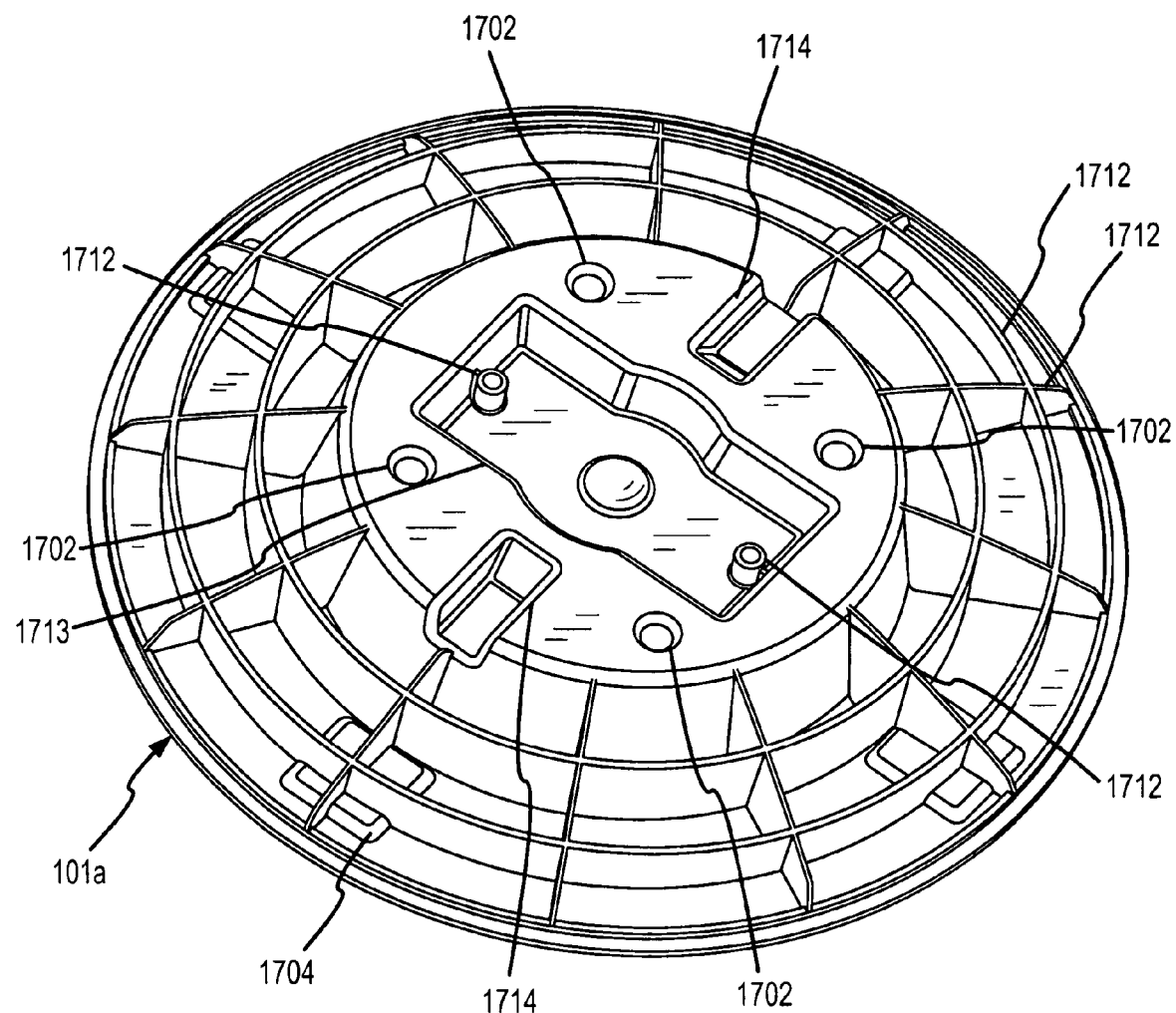
FIG. 19 shows an upper side of the base bottom half of FIG. 18.

FIG. 19 shows an upper side of the base bottom half 101a of FIG. 18. The upper side includes the fastener apertures 1702 and 1712. In addition, the base bottom half 101a includes ribs 1712, a catch basin 1713, and one or more alignment depressions 1714.

The catch basin 1713 is configured to catch liquid runoff, such as any water, soap, cleaning liquid, etc., used to clean the electrostatic precipitator cell 205. The liquid runoff can evaporate from the catch basin 1713.

The one or more alignment depressions 1714 can receive one or more corresponding projections in the base cover 1002. In addition, any corresponding alignment projections in the stud plate 1102 can also fit into the one or more alignment depressions 1714. The one or more alignment depressions 1714 can therefore serve to provide proper component orientations during assembly of the air cleaner 100.

The filter system according the invention can be implemented according to any of the embodiments in order to obtain several advantages, if desired. The invention provides an improved filter system for an air cleaner. The invention provides a unitary filter system that is easy to install and remove. The invention provides a three-dimensional filter system. The invention provides a filter system that resists deformation under a high airflow. The invention provides a filter system with increased filtering surface area for improved filtering. The invention provides a filter system with increased filtering surface area for lessening an airflow generation power requirement. The invention provides a filter system with increased filtering surface area for improved resistance to clogging. The invention provides a filter system that can transition an incoming airflow by about 90 degrees. The invention in one embodiment can provide an improved pre-filter system.

What is claimed is:

1. A filter system for an air cleaner, comprising: a filter frame adapted to fit within the air cleaner; and a filter assembly configured to fit to the frame, with the filter assembly comprising a top aperture and one or more filter panels, with a filter panel of the one or more filter panels comprising a filter element, one or more panel edges and one or more interlocking tabs formed on the one or more panel edges, with a filter panel of the one or more filter panels comprising one or more retainers formed on an edge and corresponding one or more retainer apertures formed in the filter frame.

2. The filter system of claim 1, with the filter system comprising a pre-filter system.

3. The filter system of claim 1, with the one or more filter panels comprising two or more filter panels oriented in two or more planes in a three-dimensional configuration.

4. The filter system of claim 1, with the one or more filter panels being substantially vertically oriented and with an incoming airflow being substantially horizontally oriented.

5. The filter system of claim 1, with the one or more filter panels being substantially vertically oriented and with an incoming airflow being substantially horizontally oriented, wherein the incoming airflow transitions into a substantially non-horizontal duct airflow in an air duct located in the air cleaner.

6. The filter system of claim 1, with the filter system being adapted to fit into an air duct located in the air cleaner.

7. The filter system of claim 1, with the filter frame further comprising: a transformer cover formed in the filter frame; and vent apertures formed in the transformer cover.

8. The filter system of claim 1, with the filter frame further comprising a handle.

9. The filter system of claim 1, with the filter frame further comprising one or more overhang lips and wherein the one or more filter panels fit underneath and are trapped by the one or more overhang lips.

10. A filter system for an air cleaner, comprising: a filter frame adapted to fit within the air cleaner; and a filter assembly configured to fit to the frame, with the filter assembly comprising two or more filter panels oriented in two or more planes in a three-dimensional configuration, with a filter panel of the one or more filter panels comprising a filter element, one or more panel edges and one or more interlocking tabs formed on the one or more panel edges.

11. The filter system of claim 10, with the filter system comprising a pre-filter system.

12. The filter system of claim 10, with the three-dimensional filter assembly comprising a top aperture and one or more filter panels.

13. The filter system of claim 10, with the one or more filter panels being substantially vertically oriented and with an incoming airflow being substantially horizontally oriented.

14. The filter system of claim 10, with the one or more filter panels being substantially vertically oriented and with an incoming airflow being substantially horizontally oriented, wherein the incoming airflow transitions into a substantially non-horizontal duct airflow in an air duct located in the air cleaner.

15. The filter system of claim 10, with the filter system being adapted to fit into an air duct located in the air cleaner.

16. The filter system of claim 10, with the filter frame further comprising: a transformer cover formed in the filter frame; and vent apertures formed in the transformer cover.

17. The filter system of claim 10, with the filter frame further comprising a handle.

18. The filter system of claim 10, with a filter panel of the one or more filter panels comprising one or more retainers formed on an edge and corresponding one or more retainer apertures formed in the filter frame.

19. The filter system of claim 10, with the filter frame further comprising one or more overhang lips and wherein the one or more filter panels fit underneath and are trapped by the one or more overhang lips.

20. An air cleaner, comprising: an air duct located in the air cleaner and including an air inlet and an air outlet; an air moving device located in the air duct, wherein the air moving device generates a duct airflow in the air duct from the air inlet to the air outlet; and a filter system located in the air duct and comprising a filter frame and one or more filter panels positioned in a non-orthogonal orientation from the duct air flow, with a filter panel of the one or more filter panels comprising a filter element and one or more panel edges and one or more interlocking tabs formed on the one or more panel edges wherein an incoming airflow passes through the one or more filter elements of the filter system before changing direction and transitioning into the duct airflow in the air duct, with the filter assembly comprising a top aperture and one or more filter panels.

21. The air filter of claim 20, wherein the incoming airflow is substantially perpendicular to the duct airflow.

22. The air filter of claim 20, with the air duct being substantially vertically arranged in the air cleaner, wherein the incoming airflow travels substantially horizontally into the filter system and wherein the duct airflow travels substantially vertically in the air duct.

23. The air filter of claim 20, with the one or more filter panels comprising two or more filter panels oriented in two or more planes in a three-dimensional configuration.

24. The air filter of claim 20, with the one or more filter panels being substantially vertically oriented and with an incoming airflow being substantially horizontally oriented.

25. The air filter of claim 20, with the one or more filter panels being substantially vertically oriented and with an incoming airflow being substantially horizontally oriented, wherein the incoming airflow transitions into a substantially non-horizontal duct airflow in the air duct.

26. The air filter of claim 20, with the filter system being adapted to fit to an air inlet of the air duct.

27. The air filter of claim 20, with the filter frame further comprising: a transformer cover formed in the filter frame; and vent apertures formed in the transformer cover.

28. The air filter of claim 20, with the filter frame further comprising a handle.

29. The air filter of claim 20, with a filter panel of the one or more filter panels comprising one or more retainers formed on an edge and corresponding one or more retainer apertures formed in the filter frame.

30. The air filter of claim 20, with the filter frame further comprising one or more overhang lips and wherein the one or more filter panels fit underneath and are trapped by the one or more overhang lips.

31. The filter system of claim 1, with the filter element comprising one or more of a fiber, a woven, a High Efficiency Particulate Air (HEPA), an allergen, an electrostatic, an odor absorbing, a Volatile Organic Compound (VOC), and an anti-microbial filter.

32. The filter system of claim 10, with the filter element comprising one or more of a fiber, a woven, a High Efficiency Particulate Air (HEPA), an allergen, an electrostatic, an odor absorbing, a Volatile Organic Compound (VOC), and an anti-microbial filter.

33. The air filter of claim 20, with the filter element comprising one or more of a fiber, a woven, a High Efficiency Particulate Air (HEPA), an allergen, an electrostatic, an odor absorbing, a Volatile Organic Compound (VOC), and an anti-microbial filter.

* * * * *